UNITED STATES PATENT OFFICE.

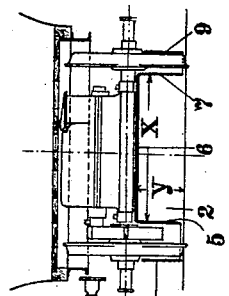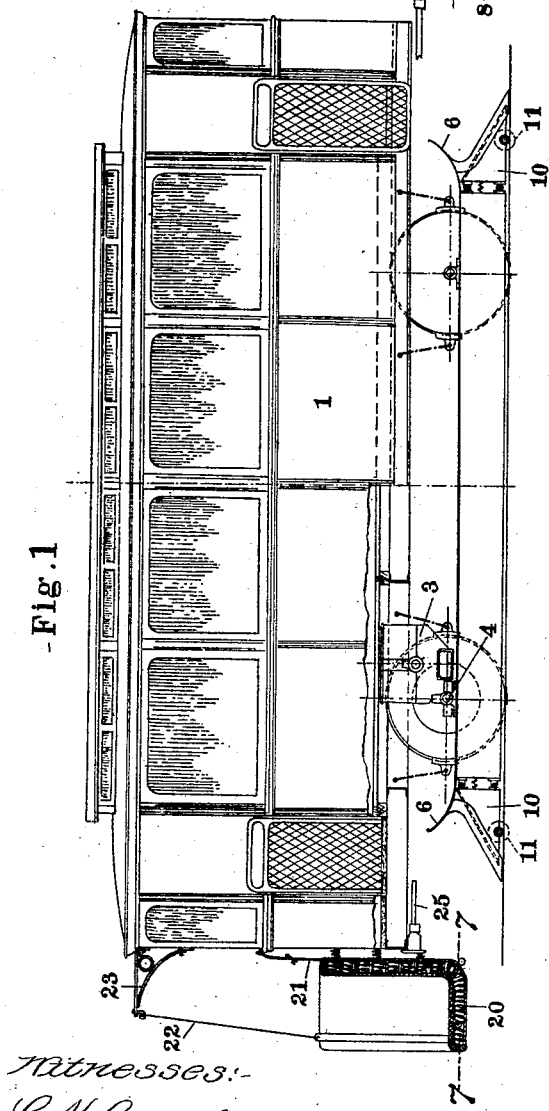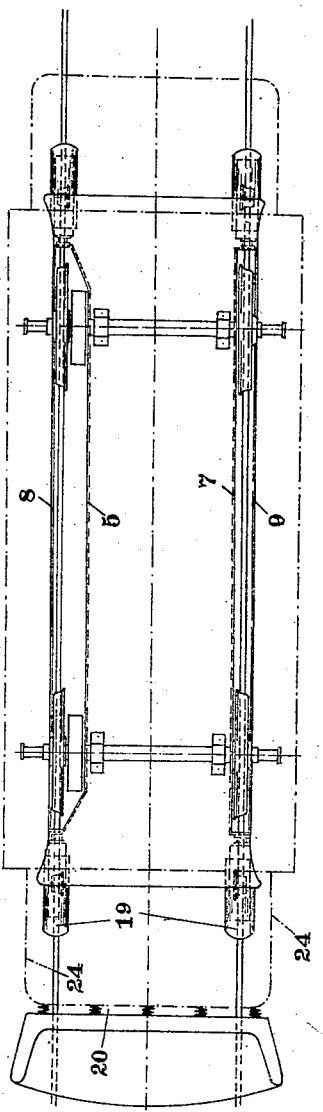

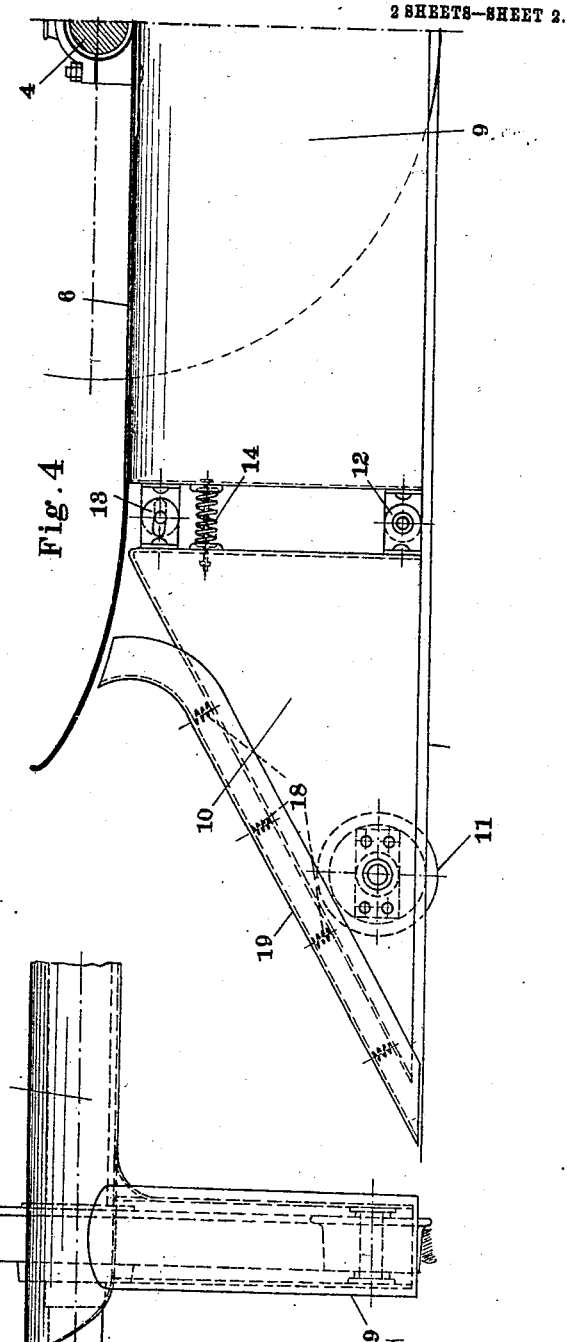

GILES SCHLICHTER AND GILES FRANKÓ, OF NYIREGYHÁZA, AUSTRIA-HUNGARY.

SAFETY APPLIANCE FOR RAILROAD-VEHICLES.

No. 917,666.      Specification of Letters Patent.      Patented April 6, 1909.

Application filed June 3, 1907. Serial No. 377,004.

*To all whom it may concern:*

Be it known that we, GILES SCHLICHTER and GILES FRANKÓ, both subjects of the King of Hungary, and residing at the city of Nyiregyháza, in the Empire of Austria-Hungary, have invented some Improvements in Safety Appliances for Railroad-Vehicles, of which the following is a specification.

The present invention has for its object a safety or life saving apparatus for motor vehicles, and more particularly for electric railway vehicles, the effectiveness of this apparatus being much superior to that of apparatus heretofore employed for the same purpose, and being such as to effectively prevent accidents.

The space between the rails and the under frame of the vehicle, according to this invention, is rendered free from danger owing to the fact that the portion of the under frame located above this space is made high and wide, and is covered with protecting plates on both sides throughout the entire length of the vehicle, so that it is readily possible for the vehicle to pass over a human body in a prone or semiprone position between the rails without injury. This passage is obtained by an appropriate arrangement of the parts of the under frame (driving and driven parts, brake mechanism and so forth) or by the provision of wheels of suitable size, or by the employment of both of these means.

The spaces between the under frame and the separate rails are rendered free from danger by means of safety shoes running on the rails, while on the front end of the vehicle a detachable spring basket is suspended at an appropriate height, and serves in the known manner to catch a person or object in the path of the vehicle or throw such person or object to one side.

One of the forms of the apparatus forming the object of the invention for use in connection with electric vehicles is shown in the accompanying drawings.

Figure 1. is a side elevation and a partial section of a vehicle showing the application of our invention thereto. Fig. 2 is a front elevation of the running gear with a portion of the car shown in section and guard in section. Fig. 3. is a plan view of the under frame some parts being omitted. Fig. 4. is a side elevation of a part of the under frame on an enlarged scale. Fig. 5 is a front elevation of one of the running wheels illustrating the guard arrangement in front of the same. Fig. 6. is a plan view of an improved coupling device. Fig. 7, is a sectional view on line 7—7 of Fig. 1.

In that portion of the under frame of the vehicle —1— (Fig. 1.) above the track between the rails, the passage —2— (Fig. 2.) is formed, which extends throughout the entire length of the vehicle. The width —$x$— and height —$y$— of said passage is so proportioned as to enable the vehicle to pass over a human body or other object lying between the rails. The bearings for the motor —3— (Fig. 3.) rest on the wheel axle —4— and are arranged on the lower portion of the motor casing, so that the entire motor is disposed above the axle —4—. The passage —2— in the under frame of the vehicle will fulfil its purpose better if it be separated from the parts situated outside it. To this end the passage is inclosed by means of suitable protecting plates —5, 6, 7— the plates —5— and —7— lying between the wheels are connected with the outer protecting plates —8. 9—, so that the movable parts of the vehicle cannot injure a person or engage an object located in the passage —2— or adjacent the lateral portions of the vehicle. The protecting plate —6— is bent upwardly at both ends of the vehicle, as shown in Fig. 1. and 4., so that enlarged entrances are formed for the passages between plates 5 and 8 and 7 and 9 for a purpose which will hereinafter more fully appear.

All the protecting plates, —5, 6, 7, 8, 9,— which may advantageously be combined so as to form a unitary structure which may be suspended from the wheel axles —4— (Fig. 4.) by means of suitable bearing boxes, 4', so that they will not participate in the vertical oscillations of the spring-hung vehicle body and may therefore extend more closely to the track.

A further feature of the invention is the provision at each angle of the safety plates —5, 6, 7, 7, 9— (Fig. 3.) of safety shoes —10— (Fig. 1.) in the form of wedge-shaped casings guided by means of rollers —11— adapted to run on the rails as shown. Each of these shoes is connected with the said plates by means of two links —12, 13— (Fig. 4.). The links —13— are connected one with the other by means of a slot and stud arrangement in such a manner that the shoe is able to move freely around the pivot formed by the links —12— to compensate for irregularities of the track. The rollers —11— of these shoes are held against the rail by means of suitable springs —14—. In order, however, that the shoes —10— may be able to move laterally with respect to the plates and follow the curves of the track, the side faces of parts —15, 16, 17— (Fig. 6.) of the links —12, 13— are made convex on adjacent sides so that the shoes —10— are able to move about a vertical axis. The object of these shoes is to deflect a body or other object lying transversely of the rails in front of the vehicle either between the rails or into the free space outside the same, or to propel such object until the vehicle is brought to a position of rest. In order that the endangered person may not in the meantime be subjected to painful shocks, shock absorbing plates —19— are mounted on springs —18— on the outer edges of the shoes (Fig. 4.).

The safety apparatus described preferably includes a safety basket —20— (Fig. 1.) which is suspended by means of belts —21— and also by means of wires —22— connected to hinged brackets —23—. The connections are preferably detachable, and the height at which the basket is arranged such that its bottom is on a level with the upper protecting plate of the under frame. The basket may be prevented from lateral movement by means of straps —24— (Fig. 3.), and suitable buffers —25— may be adapted to be provided as shown.

In the construction hereinbefore described and shown in the drawings the safety basket is preferably composed of spiral spring —27— (Fig. 7.) in order to obtain suitable resiliency; these springs being fixed on bands —26— and the ribs formed by the springs and bands being provided with suitable upholstering.

Claims.

1. A safety appliance for motor vehicles comprising in combination, a truck provided with axles, wheels mounted on said axles, a guard extending throughout the length of the vehicle beneath the truck and forming a central passage approximately co-extensive with the width and height of space between the wheels, axles and road bed, said guard also being extended to inclose the lower tread portions of the truck wheels, hoods or shoes provided with wheels located in front of said truck wheels, yieldingly mounted buffers located on said hoods, and means loosely connecting said hoods with said guard.

2. A safety appliance for motor vehicles comprising in combination, a truck provided with axles, wheels mounted on said axles, guards inclosing the lower tread portions of said wheels, shoes provided with wheels located in front of said truck wheels, yieldingly mounted buffers for said shoes, and means connecting said shoes with said guards.

3. A safety appliance for motor vehicles comprising in combination, a truck provided with axles, wheels mounted on said axles, guards inclosing the lower tread portions of said wheels, shoes provided with wheels located in front of said truck wheels, pivotal connections for said shoes and guards near the lower portions thereof, and slidable pivotal connections near the upper portions thereof.

4. A safety appliance for motor vehicles comprising in combination, a truck provided with axles, wheels mounted on said axles, guards inclosing the lower tread portions of said wheels, shoes provided with wheels located in front of said truck wheels, pivotal connections for said shoes and guards near the lower portions thereof, slidable pivotal connections near the upper portions of said shoes and guards, and springs interposed between said shoes and guards.

5. A safety appliance for motor vehicles comprising in combination, a truck provided with axles, wheels mounted on said axles, guards inclosing the tread portions of said wheels, shoes provided with wheels located in front of said truck wheels, and pivotal connections for said shoes and guards comprising overlapping members provided with convex engaging surfaces serving to permit movement of said guards in angular planes with respect to said guards.

6. A safety appliance for motor vehicles comprising in combination, a truck provided with axles, wheels for said axles, a guard extending beneath said truck and forming a central passage, safety shoes detachably mounted on said guard in front of said truck wheels, and a safety basket detachably suspended on the front of said vehicle, said basket comprising spiral springs fixed on hempen bands covered with upholstering, said guard having an upper protecting plate located approximately on a level with the bottom of the safety basket.

In the testimony whereof we affix our signatures in the presence of two witnesses this 25th day of January 1908.

GILES SCHLICHTER.
GILES FRANKO.

Witnesses:
WILLIAM GERGELY,
FREDERIC REISS.